United States Patent [19]
Saldana, III

[11] Patent Number: 5,887,787
[45] Date of Patent: Mar. 30, 1999

[54] OFFSET DOLLY TRACKS FOR TV VIDEO AND MOTION PICTURE CAMERAS

[76] Inventor: Charles Saldana, III, 4622 Cartwright Ave., Toluca Lake, Calif. 91602

[21] Appl. No.: 885,207

[22] Filed: Jun. 30, 1997

[51] Int. Cl.$^6$ .................................................... E01B 23/00
[52] U.S. Cl. ............................ 238/10 R; 238/33; 238/32; 238/50
[58] Field of Search .................................. 238/10 R, 13, 238/27, 28, 32, 33, 105, 121, 134, 151, 179, 182; 104/126; 105/50

[56] References Cited

U.S. PATENT DOCUMENTS

| | | | |
|---|---|---|---|
| 212,557 | 2/1879 | Jova | 238/10 R |
| 221,817 | 11/1879 | Heyn . | |
| 223,266 | 1/1880 | Apfeld | 238/13 |
| 658,608 | 9/1900 | Ailloud | 238/10 R |
| 1,747,945 | 2/1930 | Madison . | |
| 1,770,647 | 7/1930 | Jack . | |
| 2,278,193 | 3/1942 | Discher . | |
| 3,598,355 | 8/1971 | English . | |
| 4,989,782 | 2/1991 | McKie . | |
| 5,711,227 | 1/1998 | Johnson | 238/10 R |

FOREIGN PATENT DOCUMENTS

| | | | |
|---|---|---|---|
| 635571 | 3/1928 | France | 238/10 R |
| 1025726 | 4/1953 | France | 238/10 R |
| 329940 | 7/1919 | Germany | 238/10 R |
| 516944 | 1/1931 | Germany | 238/10 R |
| 2162 | 5/1854 | United Kingdom | 238/10 R |
| 22832 | 5/1907 | United Kingdom | 238/10 R |
| 324606 | 1/1930 | United Kingdom | 238/10 R |

OTHER PUBLICATIONS

Roadway and Track, by Walter F. Rench, Simmons–Boardman Publishing Corporation, New York, N.Y., Copyright 947, TF240.R4, 1947, pp. 164 and 165.

*Primary Examiner*—Mark T. Le
*Attorney, Agent, or Firm*—Benman & Collins

[57] ABSTRACT

An improved track assembly for TV, video and motion picture camera dollys. The inventive assembly includes first and second rail sections. The rail sections are connected by first and second spreaders. Each spreader is pivotally connected to the rails at each end of the spreader. The spreaders retain the first and second rails in a parallel offset relation in a first, deployed, position at which the first and second spreaders are disposed at a ninety degree angle relative to the first and second rails. In a particular embodiment, the first spreaders are coupled to one another by a set of fasteners which are connected to one spreader at one end and hooked onto another spreader at the other end. In the illustrative embodiment, the first and second rails include a male connector at a first end and a female connector at a second end, whereby each female connector on each rail is adapted to receive and retain a male connector from an abutting rail. Each of the rails has a uniform circular cross-sectional area. In the preferred embodiment, each rail is constructed of aluminum or other suitable material and is hollow. The assembly collapses to a second, storage and transport, position at which the first and second rails are parallel to each other and the first and second spreaders remain parallel to each other.

10 Claims, 3 Drawing Sheets

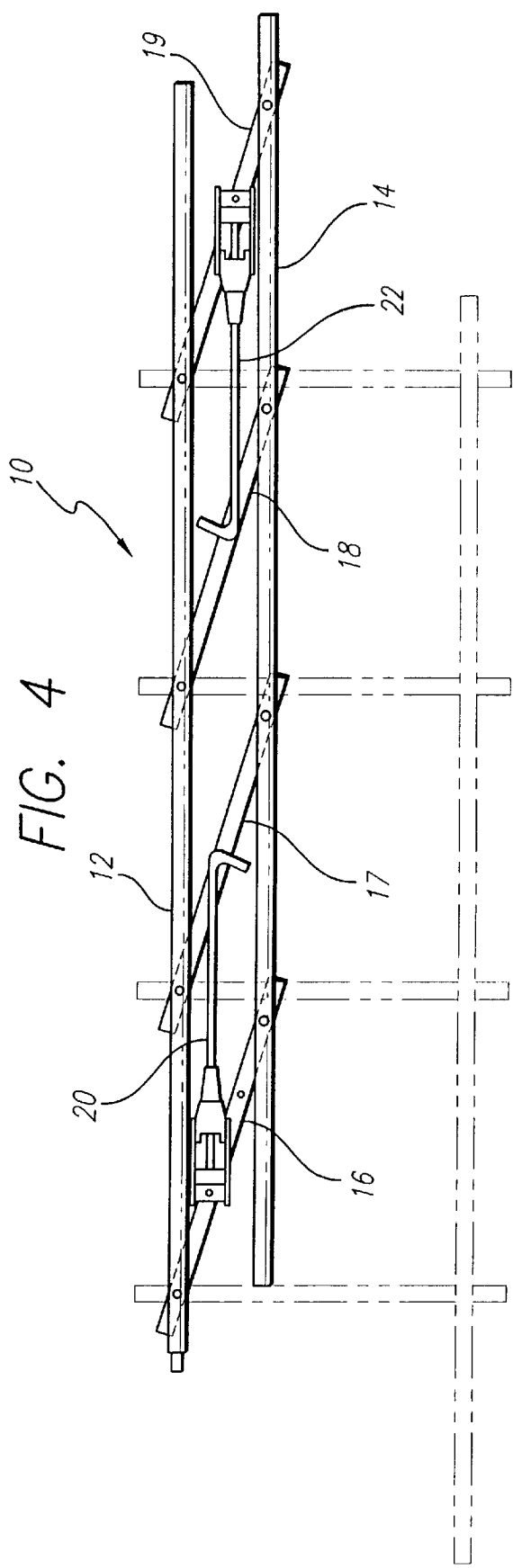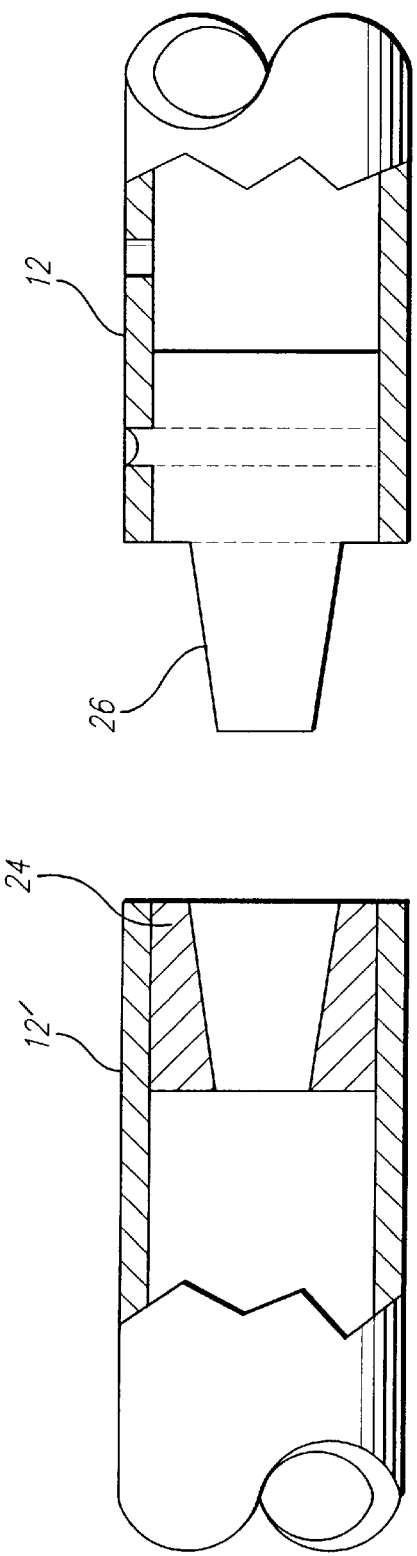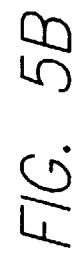

OFFSET DOLLY TRACKS FOR TV VIDEO AND MOTION PICTURE CAMERAS

BACKGROUND OF THE INVENTION

1. Field of the Invention

The present invention relates to tracks. More specifically, the present invention relates to dolly tracks for TV, video and motion picture cameras.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

2. Description of the Related Art

Television, video and motion picture cameras are often mounted on dollys which are in turn mounted on tracks. The tracks generally comprise two parallel rails. The tracked dollys allow for smooth camera translation from one point to another. In many cases, it is desirable to operate the camera during the movement thereof. In such cases, it is important that the camera be free of vibrational noise.

Unfortunately, conventional rails for camera dollys are generally of equal length and, when laid down end to end, the joints, at which the individual sections of track meet, are in alignment. Hence, a dolly wheel rolling on a first rail encounters a joint at the same location on the first rail that a second dolly wheel encounters a joint on a second rail. As a result, the joints disturb the movement of the wheels of the dolly at the same time causing an abrupt lifting and lowering of the dolly. The shock is coupled by the dolly into the camera and induces vibration into the camera. The camera movement translates to scene jitter in the image generated by the camera.

Hence, there is a need in the art for an improvement in tracks for camera dollys.

SUMMARY OF THE INVENTION

The need in the art is addressed by the present invention which provides an improved track assembly for TV, video and motion picture camera dollys. The inventive assembly includes first and second rail sections. The rail sections are connected by first and second spreaders. Each spreader is pivotally connected to the rails at each end of the spreader.

The spreaders retain the first and second rails in a parallel offset relation in a first, deployed, position at which the first and second spreaders are disposed at a ninety degree angle relative to the first and second rails.

In a particular embodiment in which multiple track assemblies are employed, the individual track assemblies are coupled to one another by a set of fasteners which are connected to one spreader of one assembly at one end and hooked onto another spreader of another assembly at the other end. In the illustrative embodiment, the first and second rails include a male connector at a first end and a female connector at a second end, whereby each female connector on each rail is adapted to receive and retain a male connector from an abutting rail such that the rails are interlocking. Each of the rails has a uniform circular cross-sectional area. In the preferred embodiment, each rail is constructed of aluminum or other suitable material and is hollow. The assembly collapses to a second, storage and transport, position at which the first and second rails are parallel to each other and the first and second spreaders remain parallel to each other.

BRIEF DESCRIPTION OF THE DRAWINGS

FIG. 4 is a top view of the improved track assembly of the present invention in a second collapsed position.

FIG. 5a depicts a female connector at a first end of a rail.

FIG. 5b depicts a male connector at a second end of a rail.

DESCRIPTION OF THE INVENTION

Illustrative embodiments and exemplary applications will now be described with reference to the accompanying drawings to disclose the advantageous teachings of the present invention.

Figure 1:
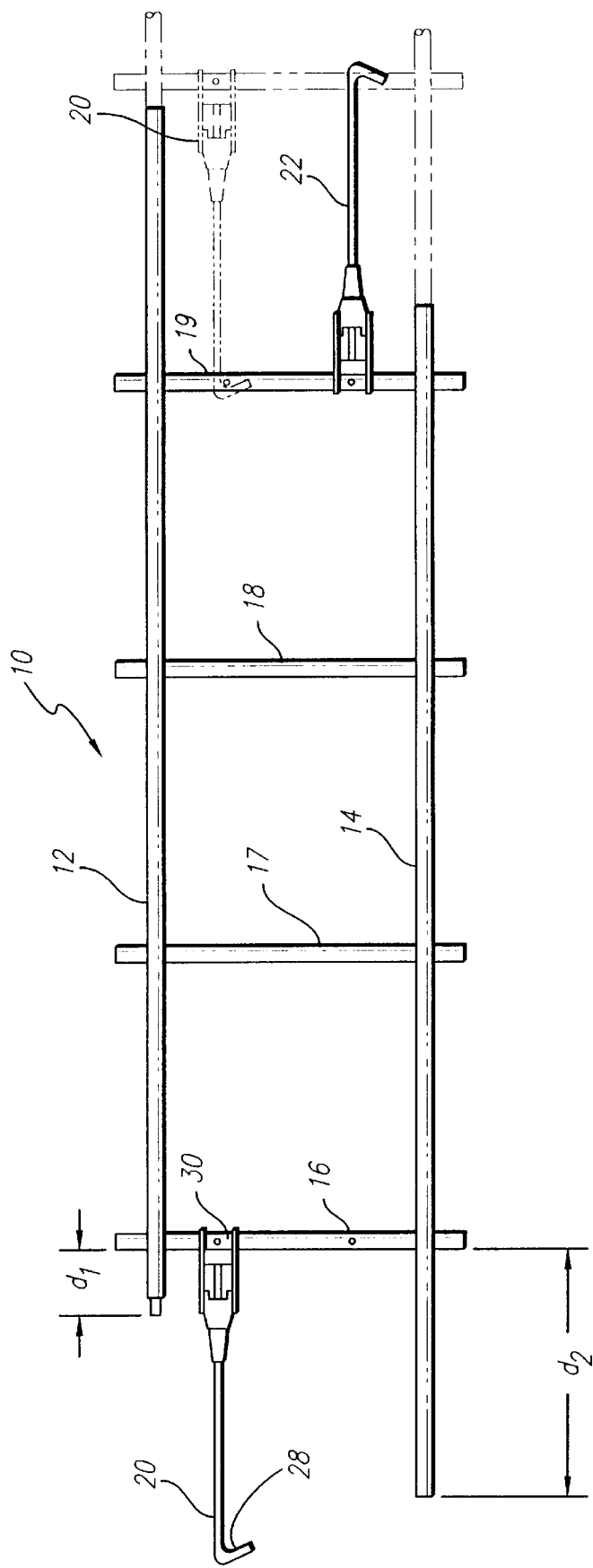
FIG. 1 is a top view of the improved track assembly of the present invention in a first deployed position.

FIG. 1 is a top view of the improved track assembly of the present invention in a first deployed position. The inventive assembly 10 includes first and second rails 12 and 14. As depicted in the sectional end and side views of FIGS. 2 and 3 respectively, the rails 12, 14 have a circular cross-sectional area and are generally hollow. In the preferred embodiment, the rails 12, 14 are constructed of aluminum or other suitable material.

Returning to FIG. 1, the first and second rails 12 and 14 are maintained in a proper relative orientation by a plurality of spreaders 16–19. Each spreader is pivotally connected to one rail at one end and to the second rail at the other. The allows the track assembly 10 to be compressed from the open deployed position of FIG. 1 to the collapsed transportation and storage position of FIG. 4.

Figure 3:
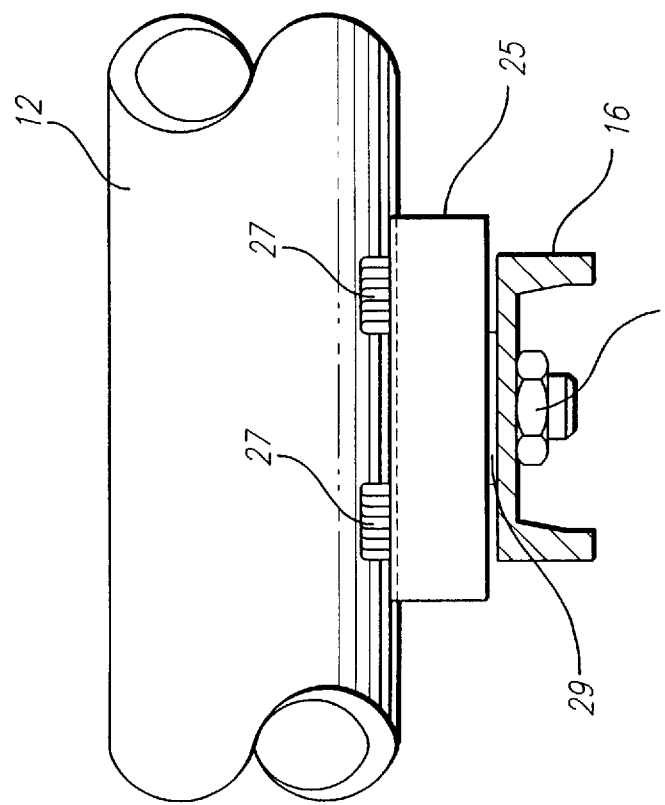
FIG. 3 is a side view of the section of rail depicted in FIG. 2.
Figure 2:
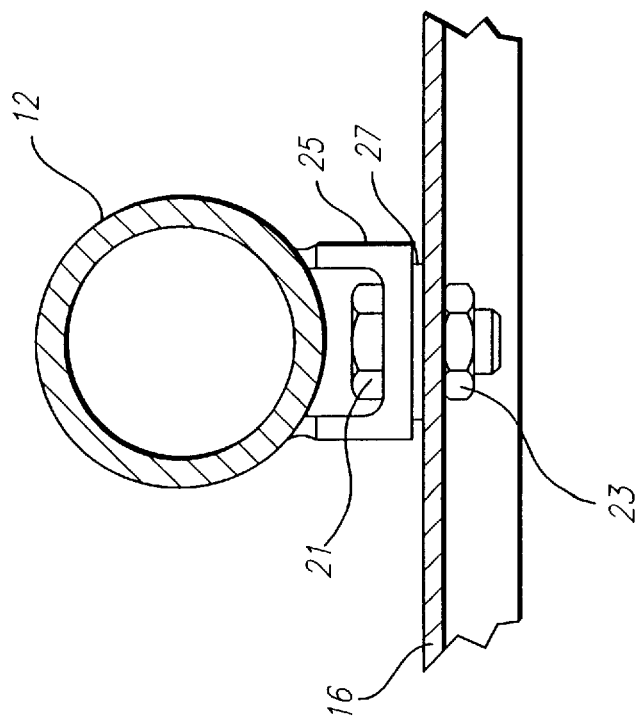
FIG. 2 is a sectional end view of a rail of the assembly of FIG. 1.

As illustrated in FIGS. 2 and 3, the spreaders are secured to the rails by a nut and bolt arrangement including a bolt 21 and a nut 23. The bolt 21 extends through a suitable hole in a U-shaped spacer 25 which is secured to the rail 12 by a plurality of welds 27. The bolt 21 extends through a washer 29 and the spreader 16. A nut secures the assembly together. Those skilled in the art will appreciate that other arrangements may be used to secure the assembly together without departing from the scope of the present teachings. The spacer and spreader may also be constructed of aluminum or other suitably rigid and lightweight material.

In practice, each section of track assembly 10 is connected to additional identical sections of track assembly, shown in phantom in FIG. 1, to provide a track of sufficient length for a given application as will be appreciated by those skilled in the art. Note that the distance $d_1$ from the end of the first rail 12 to the first spreader 16 is different than the distance $d_2$ from the end of the second rail 14 to the first spreader 16. Hence, the joints at which each rail is connected to an abutting section of rail (not shown) are not aligned. This mitigates vibrational noise induced to a camera or other apparatus riding on the track assembly 10 due to travel over the joints.

Smooth joint transitions are further facilitated by the provision of male and female connectors at the ends of each rail section. This is depicted in FIGS. 5a and 5b. FIG. 5a depicts a sectional view of the end of a rail 12' from a first track assembly 10' (not shown). A grommet 24 constructed of plastic, rubber, metal or other suitable material is fitted within the open female end of the rail 12'. The grommet 24 has an aperture which is tapered to match the taper of a male protrusion 26 from the rail 12 from a track assembly 10 to which the second track assembly 10' is to be joined. The protrusion 26 may also be constructed of plastic, rubber, metal or other suitable material. The protrusion 26 is fitted into the open male end of the rail 12.

Returning to FIG. 1, the first and last spreaders 16 and 19 of each track assembly 10 are equipped with a hook fastener 20 and 22. Each fastener has a hook 28 at one end and is welded or bolted to the spreader at a second end 30. The fastener may be constructed of any suitable material such as metal. The fasteners 20 and 22 serve to secure the track assembly to an adjacent track assembly.

In operation, the assembly is deployed as shown in FIG. 1. Next, another assembly is deployed as shown in FIG. 1 and the two assemblies are connected via the male and female connectors thereof Finally, the assemblies are secured to each other by fasteners 20 and 22 thereof to complete a track of any desired length.

Thus, the present invention has been described herein with reference to a particular embodiment for a particular application. Those having ordinary skill in the art and access to the present teachings will recognize additional modifications applications and embodiments within the scope thereof.

It is therefore intended by the appended claims to cover any and all such applications, modifications and embodiments within the scope of the present invention.

Accordingly,

What is claimed is:

1. A track assembly comprising:
    first and second sets of tracks, each set of tracks having:
        a first rail with a circular cross-section;
        a second rail with a circular cross-section;
        a first spreader pivotally connected to said first rail at a first end and to said second rail at a second end;
        a second spreader pivotally connected to said first rail at a first end and to said second rail at a second end;
        a first fastener attached at a first end to said first spreader of said first set of tracks and attached at a second end to the second spreader of the second set of tracks, said second end of said first fastener having a hook adapted to extend over and at least partially around said second spreader; and
        a second fastener attached at a first end to said second spreader of said second set of tracks and attached at a second end to the first spreader of the first set of tracks, said second end of said second fastener having a hook adapted to extend over and at least partially around said first spreader;
    whereby said first and second sets of tracks are maintained in end to end relation and said first and second rails thereof are retained in a parallel offset relation in a first, deployed, position at which said first and second spreaders are disposed at a ninety degree angle relative to said first and second rails.

2. The invention of claim 1 wherein said first and said second rails include a male connector at a first end and a female connector at a second end, whereby each female connector on each rail is adapted to receive and retain a male connector from an abutting rail.

3. The invention of claim 1 wherein each of said rails is hollow.

4. The invention of claim 2 wherein each of said rails is constructed of aluminum.

5. The invention of claim 1 further including a spacer positioned between each of said rails and each of said spreaders.

6. The invention of claim 1 whereby said assembly collapses to a second, storage and transport, position at which said first and second rails are parallel to each other and said first and second spreaders remain parallel to each other.

7. A track assembly comprising:
    first and second sets of tracks, each set of tracks having:
        a first rail with a circular cross-section and a second rail with a circular cross-section, said first and said second rails including a male connector at a first end and a female connector at a second end, whereby each female connector on each rail is adapted to receive and retain a male connector from an abutting rail;
        a first spreader pivotally connected to said first rail at a first end and to said second rail at a second end;
        a second spreader pivotally connected to said first rail at a first end and to said second rail at a second end;
        a first fastener attached at a first end to said first spreader of said first set of tracks and attached at a second end to the second spreader of the second set of tracks, said second end of said first fastener having a hook adapted to extend over and at least partially around said second spreader; and
        a second fastener attached at a first end to said second spreader of said second set of tracks and attached at a second end to the first spreader of the first set of tracks, said second end of said second fastener having a hook adapted to extend over and at least partially around said first spreader;
    whereby said first and second sets of tracks are maintained in end to end relation and said first and second rails thereof are retained in a parallel offset relation in a first, deployed, position at which said first and second spreaders are disposed at a ninety degree angle relative to said first and second rails of each set of tracks and said assembly may be converted to a second, storage and transport, position at which said first and second rails of each set of tracks are parallel to each other and said first and second spreaders are parallel to each other and disposed at an angle less than ninety degrees relative to said first and second rails.

8. The invention of claim 7 wherein each of said rails is hollow.

9. The invention of claim 7 wherein each of said rails is constructed of aluminum.

10. The invention of claim 7 further including a spacer positioned between each of said rails and each of said spreaders.

* * * * *